United States Patent [19]
Hac

[11] Patent Number: 5,931,887
[45] Date of Patent: Aug. 3, 1999

[54] BRAKE CONTROL METHOD BASED ON A LINEAR TRANSFER FUNCTION REFERENCE MODEL

[75] Inventor: Aleksander Boguslaw Hac, Dayton, Ohio

[73] Assignee: General Motors Corporation, Detroit, Mich.

[21] Appl. No.: 09/160,275

[22] Filed: Sep. 24, 1998

[51] Int. Cl.[6] .......................... G06F 19/00; A60K 28/16
[52] U.S. Cl. ............................. 701/71; 701/70; 701/72; 701/74; 303/140; 303/146
[58] Field of Search .................. 701/70, 42, 71, 701/72, 74; 364/578; 303/140, 132

[56] References Cited

U.S. PATENT DOCUMENTS

| | | | |
|---|---|---|---|
| 4,834,205 | 5/1989 | Mizuno et al. | 180/141 |
| 5,063,514 | 11/1991 | Headley et al. | 364/426.02 |
| 5,172,961 | 12/1992 | Inoue et al. | 303/100 |
| 5,229,944 | 7/1993 | Yasuno | 364/426.01 |
| 5,275,475 | 1/1994 | Hartmann et al. | 303/103 |
| 5,311,431 | 5/1994 | Cao et al. | 364/424.05 |
| 5,341,297 | 8/1994 | Zomotor et al. | 364/426.03 |
| 5,366,281 | 11/1994 | Littlejohn | 303/3 |
| 5,402,342 | 3/1995 | Ehret et al. | 364/424.05 |
| 5,444,621 | 8/1995 | Matsunaga et al. | 364/424.05 |
| 5,480,219 | 1/1996 | Kost et al. | 303/146 |
| 5,720,533 | 2/1998 | Pastor et al. | 303/147 |
| 5,746,486 | 5/1998 | Paul et al. | 303/146 |
| 5,816,669 | 10/1998 | Hiwatashi et al. | 303/140 |

FOREIGN PATENT DOCUMENTS

| | | |
|---|---|---|
| 0 555 860 A1 | 8/1993 | European Pat. Off. . |
| 41 23 235 C1 | 11/1992 | Germany . |
| 41 21 954 A1 | 1/1993 | Germany . |
| 42 00 061 A1 | 7/1993 | Germany . |
| 42 23 385 A1 | 1/1994 | Germany . |
| 42 29 504 A1 | 3/1994 | Germany . |
| 43 11 077 A1 | 10/1994 | Germany . |
| 43 14 827 A1 | 11/1994 | Germany . |
| 40 52 62213 | 10/1993 | Japan ................. B60T 8/32 |
| 40 60 24304 | 2/1994 | Japan ................. B60T 8/24 |
| 40 60 87421 | 3/1994 | Japan ................. B60T 8/32 |
| 40 61 15418 | 4/1994 | Japan ................. B60T 8/24 |
| 40 61 27354 | 5/1994 | Japan ................. B60T 8/24 |
| 2 275 551 | 1/1993 | United Kingdom . |
| 2 263 340 | 7/1993 | United Kingdom . |
| 2 269 571 | 2/1994 | United Kingdom . |
| 2 275 312 | 8/1994 | United Kingdom . |

OTHER PUBLICATIONS

May The Cornering Force Be With You; Popular Mechanics; Dec. 1995, pp. 74–77.
Stable as She Goes: Don Sherman, Automotive Industries, May 1995.
The Spin Doctors: Don Sherman, 12PS95.
Mercedes/Bosch Esp; Automotive Industries, Apr. 1995.
Controlling Vehicle Stability; Christopher A. Sawyer, Automotive Industries, Jan. 1995.

(List continued on next page.)

*Primary Examiner*—William A. Cuchlinski, Jr.
*Assistant Examiner*—Arthur Donnelly
*Attorney, Agent, or Firm*—Anthony Luke Simon

[57] ABSTRACT

An active brake control method including an improved method of developing the desired state variables, enabling the system designer to specify the damping ratio and the un-damped natural frequency of desired vehicle performance. The desired state variables are determined by converting a linear time domain model into a transfer function model and solving for the lateral velocity and yaw rate as a function of the driver steering angle, the damping ratio, the un-damped natural frequency of the vehicle, and the transfer function zeros. The damping ratio, the un-damped natural frequency of the vehicle, and the transfer function zeros may either be computed or specified in a look-up table as a function of vehicle speed. This allows the system designer to provide increased damping at high vehicle speeds, for example.

8 Claims, 8 Drawing Sheets

OTHER PUBLICATIONS

Let Magic Fingers Do The Driving: Wards Auto World; May 1995.

Technoid: Intelligent Brakes are on the Way; Car and Driver, Aug. 1994.

Toyota Vehicle Stability Control System; Automotive Engineering, Aug. 1995.

Vehicle Dynamics Offers New Level of Safety: Machine Design, Sep. 1994.

Handling Control Systems for Your Car: Popular Electronics; Feb. 1995.

VDC, The Vehicle Dynamics Control System of Bosch: A. VanZanten, R. Erhardt and G. Pfaff; Robert Bosch GmbH, No. 950759, pp. 9–26.

Active Stability Control; Junichi Kubokawa, Aisin Seiko Co., Ltd., Electronics & Brake Division; Abstract; Sep. 1995.

Consideration of Lateral and Longitudinal Vehicle Stability by Function Enhanced Brake and Stability Control System; Heinz Leffler, SAE #940832; Feb. 28–Mar. 3, 1994.

Control of Vehicle Dynamics: Automotive Engineering; pp. 87–93; May 1995.

Improvement of Vehicle Maneuverability by Direct Yaw Moment Control; Y. Shibahata, K. Shimada and T. Tomari; Society of Automotive Engineers of Japan, Inc.; pp. 464–481.

Spin Control for Cars; Steven Ashley; Mechanical Engineering; pp. 66–68; Jun. 1995.

BRAKE CONTROL METHOD BASED ON A LINEAR TRANSFER FUNCTION REFERENCE MODEL

TECHNICAL FIELD

This invention relates to a motor vehicle brake control method, and more particularly to a control based on a linear transfer function reference model.

BACKGROUND OF THE INVENTION

Chassis control technology has achieved noteworthy progress, thanks to advancements in sensing and computing technologies as well as advances in estimation and control theory. This has permitted the design of various control systems using active means to maneuver the vehicle. One such enhancement is the control of individual braking forces at the vehicle wheels for developing a certain yaw response. In general, such controls include a reference model for developing desired state variables such as yaw rate, vehicle side slip angle, and lateral acceleration, and a closed-loop algorithm for developing a yaw moment command based on the detected deviation between the desired values and measured values. The controls are generally designed to force the vehicle to conform to linear-like operation even when the vehicle is in a non-linear mode. Accordingly, the desired vehicle states are typically derived from a linear model of the vehicle.

Most systems of the type described above employ a time-domain vehicle model based on a set of linear differential equations describing the vehicle dynamics in the yaw plane. An advantage of that approach is that the system designer can shape the vehicle response characteristics to particular needs by adjusting model parameters such as cornering stiffness. But some dynamic response parameters, such as the damping ratio and the un-damped natural frequency, can be adjusted only indirectly. Accordingly, it would be desirable to have a system that provides more flexibility in directly shaping the dynamic response parameters of the control.

SUMMARY OF THE PRESENT INVENTION

The present invention is directed to an active brake control method including an improved method of developing the desired state variables, enabling the system designer to specify the damping ratio and the un-damped natural frequency of desired vehicle performance.

According to the invention, the desired state parameters are determined by converting a linear time domain model into a frequency domain, or transfer function model and solving for the lateral velocity and yaw rate as a function of the driver steering angle, the damping ratio, the un-damped natural frequency of the vehicle, and the transfer function zeros. The damping ratio, the un-damped natural frequency of the vehicle, and the transfer function zeros may either be computed or specified in a look-up table as a function of vehicle speed. This allows the system designer to provide increased damping at high vehicle speeds, for example.

On a more specific level, the invention involves developing frequency domain transfer functions describing ratios of the yaw rate and lateral velocity to driver steering angle as a function of vehicle speed for linear operation of the vehicle, and determining the un-damped natural frequency, the damping ratio and the zeros of the reference model transfer functions. The desired yaw rate, lateral velocity and vehicle slip angle are then computed as a function of measured vehicle speed and steering angle, the un-damped natural frequency, the damping ratio, and the control system zeros. The desired lateral acceleration, in turn, is determined based on the desired lateral velocity and yaw rate, and a yaw moment control command is developed based on detected deviations between the desired and measured yaw rate and the desired and estimated vehicle slip angles. The corrective yaw moment control command is then carried out by differentially braking wheels of said vehicle using a suitable brake force distribution technique.

DETAILED DESCRIPTION OF THE INVENTION

Figure 1:
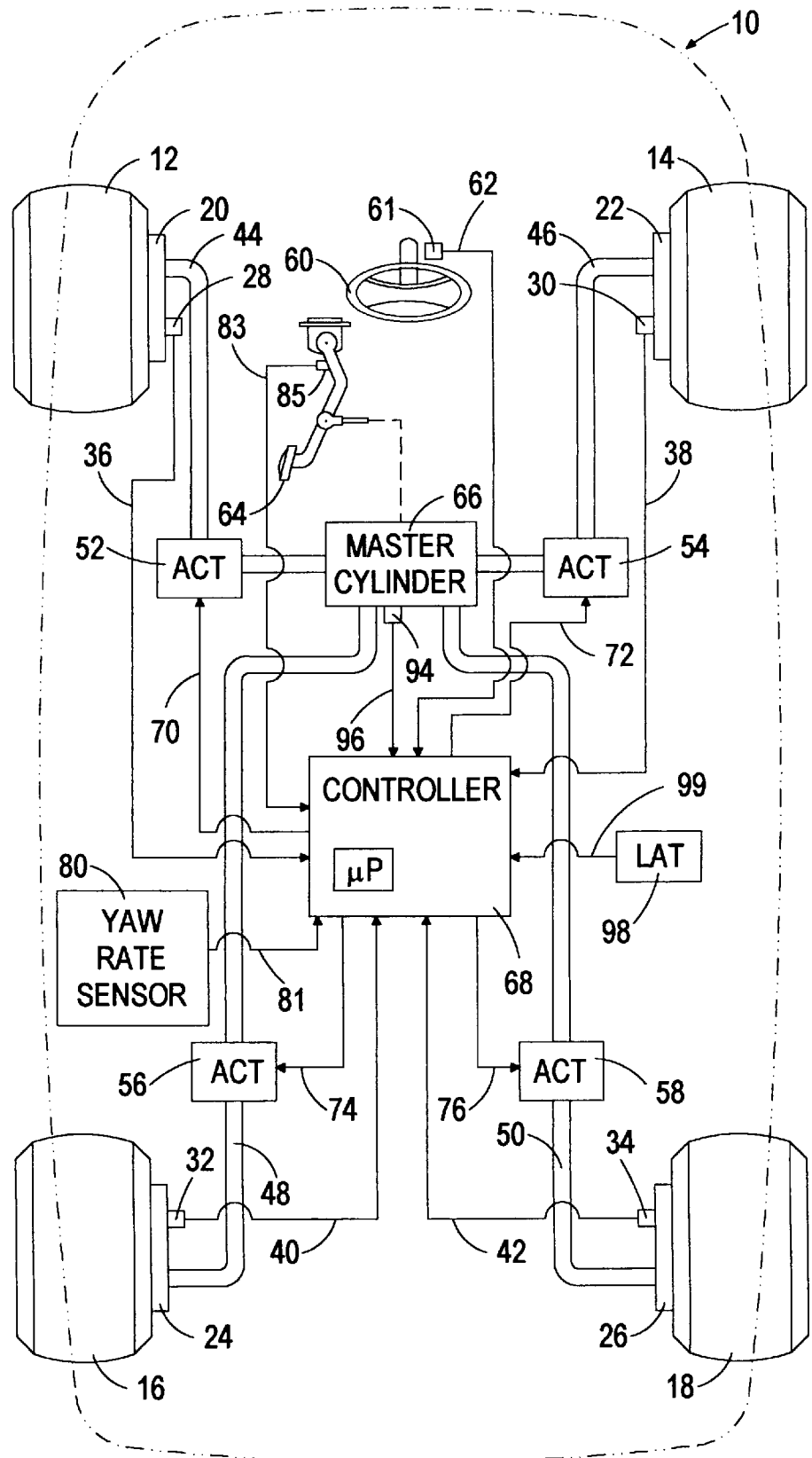
FIG. 1 is a diagram of a vehicle including an electronic controller and associated input and output devices constituting a control system for carrying out an active brake control.

FIG. 1 depicts a mechanization of a brake control according to this invention on a vehicle 10. The vehicle 10 includes a brake system having a microprocessor based controller 68 for controlling the brakes 20, 22, 24, 26 of the respective wheels 12, 14, 16, 18. The controller 68 receives various inputs, including wheel speed signals on lines 36, 38, 40, 42 from respective wheel speed sensors 28, 30, 32, 34; a brake pedal travel signal on line 83 from pedal travel sensor 85; a steering wheel angle signal on line 62 from angle sensor 61; a yaw rate signal on line 81 from yaw rate sensor 80; a master cylinder pressure signal on line 96 from the pressure sensor 94; and a lateral acceleration signal on line 99 from the lateral accelerometer 98. The sensors 28, 30, 32, 34, 61, 80, 85, 98 may be implemented with conventional devices in a manner known to those skilled in the art.

Under certain conditions such as wheel lock-up or spinning, or lateral nonlinear operation, the controller 68 modifies the normal braking of one or more wheel 12, 14, 16, 18 via the respective actuators 52, 54, 56, 58 in order to restore a desired overall operation of the vehicle. In an incipient lock-up condition, the controller 68 commands one or more of the respective actuator(s) 52, 54, 56, 58 to modulate the brake force developed at the wheel(s) experiencing the condition. In a wheel slip condition, the controller 68 commands one or more of the respective actuator(s) 52, 54, 56, 58 to develop brake force at the slipping wheel(s). In a case of lateral non-linear operation, the controller 68 commands one or more of the respective actuator(s) 52, 54, 56, 58 selectively increase or decrease the brake forces generated at the various wheels 12, 14, 16, 18 to bring the vehicle yaw rate and slip angle into conformance with the desired yaw rate and slip angle; the control may be carried in a two-channel system in which only the front brakes 20, 22 are controlled, or a four-channel system in which all four brakes 20, 22, 24, 26 are controlled. Exemplary actuators are shown and described in detail in the U.S. Pat. No. 5,366,291, assigned to the assignee of the present invention.

Figure 2:
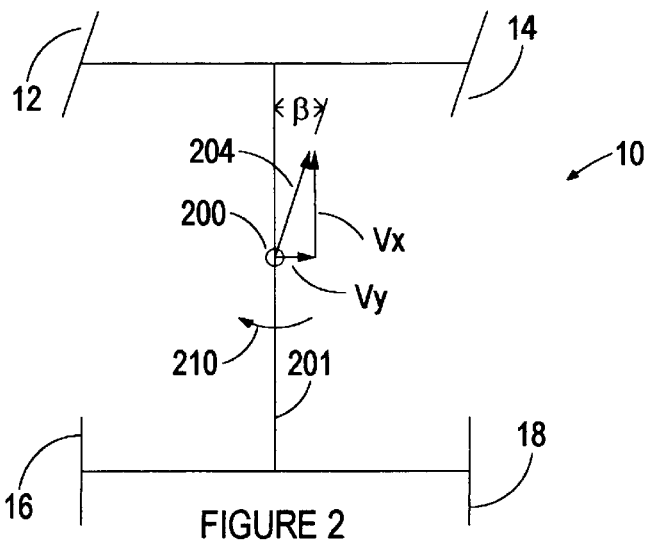
FIG. 2 is a vector diagram of a vehicle for defining yaw and side slip concepts.

FIG. 2 schematically depicts the vehicle 10 in a turning maneuver, and illustrates the concepts of slip angle and yaw rate control. The longitudinal, or x-axis of the vehicle is designated by the reference numeral 201, and the vector 204 designates the velocity of the vehicle's center of gravity 200, which has longitudinal velocity component $V_x$ and lateral (or side-slip) velocity component $V_y$. The vector 204 deviates from the x-axis 201 by an angle $\beta$ known as the vehicle side slip angle. The reference numeral 210 designates the yaw rate $\Omega$, which is the velocity of rotation about the vertical axis of vehicle, measured by the sensor 80 of FIG. 1.

During linear operation of the vehicle 10, the yaw rate $\Omega$ and slip angle $\beta$ have fixed relationships to the steering wheel angle and the forward or longitudinal velocity $V_x$. In non-linear operation, the tires experience significant lateral motion with respect to the road surface, and the above-described relationships become no longer fixed. When controller 68 recognizes that the yaw rate or slip angle relationships are becoming non-linear, it applies braking forces to counteract an undesired yaw moment, or possibly reduces braking forces to introduce a yaw moment.

In the illustrated embodiment, the control is carried out as a function of vehicle speed (which may be determined from the four wheel speed sensors), driver steering angle, the measured lateral acceleration and yaw rate, and a braking indication (which may be determined by the master cylinder brake pressure or by brake pedal travel or switch). Using these inputs, the controller 68 determines a desired vehicle yaw rate, a desired lateral acceleration, and a desired slip angle. The desired yaw rate is compared with the measured yaw rate to determine yaw rate error, and the desired slip angle is compared with an estimated slip angle to determine slip angle error. If the determined yaw rate and/or slip angle errors exceed respective threshold amounts, the controller 68 determines and outputs commands to actuators 52, 54, 56, 58 to control the wheel brakes 20, 22, 24, 26 so as to counter the determined error(s). In a two channel system, only brakes 20 and 22 are controlled via actuators 52 and 54.

Figure 3:
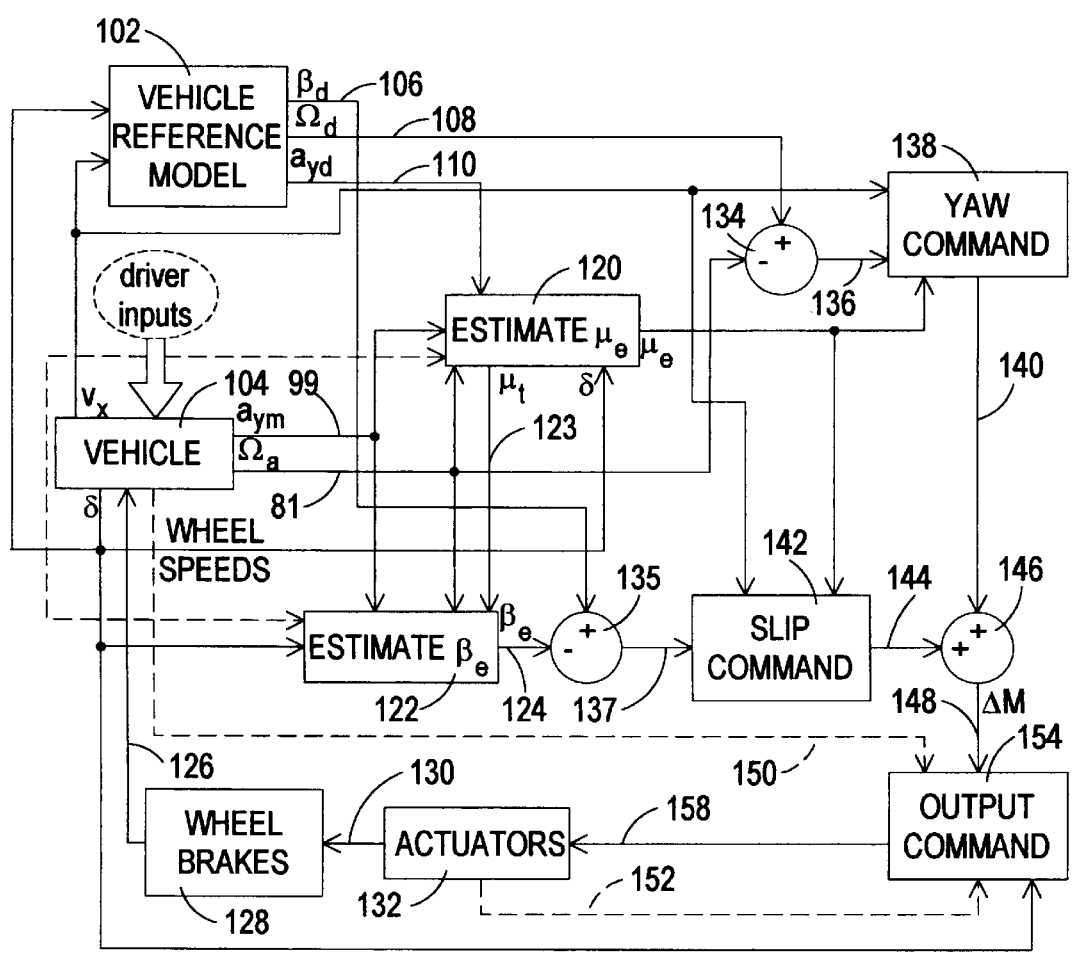
FIG. 3 is a block diagram of the active brake control system of FIG. 1, including an example transfer function reference model in accordance with this invention.

FIG. 3 depicts a block diagram of an active brake control incorporating the linear reference model of this invention. In addition to the reference model 102, the block diagram includes a surface coefficient of adhesion estimator 120, a slip angle estimator 122, yaw and slip command blocks 138 and 142, and output command block 154. The vehicle is designated by the block 104, and the brake actuators and brakes are designated generally by the blocks 132 and 128.

The vehicle reference model 102 develops the desired yaw rate, slip angle and lateral acceleration as a function of the inputs depicted in FIG. 3. According to this invention, the reference model is in the form of velocity-dependent transfer functions between the driver steering angle $\delta$ and the desired values of yaw rate $\Omega_d$, slip angle $\beta_d$ and lateral velocity $V_{yd}$. These transfer functions are obtained by taking the Laplace transform of the time domain linear differential equations:

$$d(V_{yd})/dt = a_{11}*V_{yd} + a_{12}*\Omega_d + b_1*\delta, \text{ and} \tag{1}$$

$$d(\Omega_d)/dt = a_{21}*V_{yd} + a_{22}*\Omega_d + b_2*\delta. \tag{2}$$

The coefficients $a_{11}$, $a_{12}$, $a_{21}$, $a_{22}$, $b_1$ and $b_2$ are given according to the expressions:

$$a_{11} = -(c_{of} + c_{or})/(M*V_x)$$

$$a_{12} = (-c_{of}*a + c_{or}*b)/(M*V_x) - V_x,$$

$$a_{21} = (-c_{of}*a + c_{or}*b)/(I_{zz}*V_x),$$

$$a_{22} = (-c_{of}*a^2 - c_{or}*b^2)/(I_{zz}*V_x),$$

$$b_1 = c_{of}/M, \text{ and}$$

$$b_2 = a*c_{of}/I_{zz} \tag{3}$$

where M is the vehicle mass, $I_{zz}$ is the moment of inertia about the yaw axis through the center of gravity 200, a and b are distances from the center of gravity 200 to the front and rear axles of the vehicle, $c_{of}$ and $c_{or}$ are the maximum cornering stiffness coefficients of both tires of the front and rear axles, respectively.

The corresponding frequency domain transfer functions are:

$$\frac{V_{yd}(s)}{\delta(s)} = \frac{b_1*s + [a_{12}(V_x)*b_2 - a_{22}(V_x)*b_1]}{s^2 - [a_{11}(V_x) + a_{22}(V_x)]s + [a_{11}(V_x)*a_{22}(V_x) - a_{12}(V_x)*a_{21}(V_x)]}, \text{ and} \tag{4}$$

$$\frac{\Omega_d(s)}{\delta(s)} = \frac{b_2*s + [-a_{11}(V_x)*b_2 - a_{21}(V_x)*b_1]}{s^2 - [a_{11}(V_x) + a_{22}(V_x)]s + [a_{11}(V_x)*a_{22}(V_x) - a_{12}(V_x)*a_{21}(V_x)]}. \tag{5}$$

Since the denominator of both transfer functions are the same, and have the characteristic equation of the form:

$$s^2 + 2*\zeta(V_x)*\omega_n(V_x)*s + \omega_n^2(V_x) = 0 \tag{6}$$

the un-damped natural frequency $\omega_n$ and the damping ratio $\zeta$ may be given by the equations:

$$\omega_n = [(c_f*c_r*(a+b)^2/M*I_{zz}*V_x^2) + (c_r*b - c_f*a)/I_{zz}]^{1/2} \text{ and} \tag{7}$$

$$\zeta = [(c_f+c_r)/M + (c_f*a^2 + c_r*b^2)/I_{zz}]/2*[(c_f*c_r*(a+b)^2/M*I_{zz}) + (c_r*b - c_f*a)*V_x^2/I_{zz}]^{1/2} \tag{8}$$

Significantly, $\omega_n$ and $\zeta$ both decrease with increasing vehicle speed, generally yielding an under-damped system at high speeds. This can be countered according to this invention by utilizing user-defined values $\omega_n$ and $\zeta$ in order to increase the level of damping at high speeds, compared to the linear model.

The zeros of the lateral velocity and yaw rate transfer functions, designated as $z_{vy}$ and $z_\Omega$, are given by the expressions:

$$z_{vy} = a_{22} - (b_2*a_{12}/b_1) = [-c_r*b*(a+b) + M*a*V_x^2]/I_{zz}*V_x, \text{ and} \tag{9}$$

$$z_\Omega = a_{11} - (b_1*a_{21}/b_2) = -c_r*(a+b)/M*a*V_x. \tag{10}$$

Significantly, $z_\Omega$ is always negative, whereas $z_{vy}$ changes sign from negative to positive at the velocity $V_{x1} = [c_r*b*(a+b)/M*a]^{1/2}$.

Rewritten in term of the zeros $z_{vy}$ and $z_\Omega$, the transfer functions become:

$$\frac{V_{yd}(s)}{\delta(s)} = \frac{b_1 * [s - z_{vy}(V_x)]}{s^2 + 2*\zeta(V_x)*\omega_n(V_x)*s + \omega_n^2(V_x)}. \quad (11)$$

$$\frac{\Omega_d(s)}{\delta(s)} = \frac{b_2 * [s - z_\Omega(V_x)]}{s^2 + 2*\zeta(V_x)*\omega_n(V_x)*s + \omega_n^2(V_x)} \quad (12)$$

Under steady state conditions (i.e., s=0), the ratios $V_{yd}/\delta$ and $\Omega_d/\delta$ are given by the expressions:

$$\frac{V_{yd}}{\delta} = \frac{b_1 * z_{vy}(V_x)}{\omega_n^2(V_x)}, \text{ and} \quad (13)$$

$$\frac{\Omega_d}{\delta} = \frac{b_2 * z_\Omega(V_x)}{\omega_n^2(V_x)}. \quad (14)$$

According to this invention, the desired yaw and lateral velocity values are determined by passing the steering angle 6 through a second order filter having a transfer function of $1/[s^2+2*\zeta(V_x)*\omega_n(V_x)*s+\omega_n^2(V_x)]$, and then passing the output through (1) a filter having the transfer function $b_1*[s-z_{vy}(V_x)]$ to obtain the desired lateral velocity $V_{yd}$, and (2) a filter having the transfer function $b_2*[s-z_\Omega(V_x)]$ to obtain the desired yaw rate $\Omega_d$. The un-damped natural frequency $\omega_n$ and the damping ratio $\zeta$ may be either computed using equations (7) and (8), or may be specified in a look-up table as a function of vehicle speed, to provide higher damping at high speeds, for example. Similarly, the zeros $z_{vy}$ and $z_\Omega$ may be computed using equations (9) and (10), or may be specified in a look-up table as a function of vehicle speed, and possibly steering angle.

A second order filter having the transfer function of $1/[s^2+2*\delta(V_x)*\omega_n(V_x)*s+\omega_n^2(V_x)]$ may be implemented recursively using the time-domain equations:

$$x_1(k+1)=\delta(k)+(1-2*\Delta t*\zeta*\omega_n)*x_1(k)-\Delta t*\omega_n^2*x_2(k) \text{ and} \quad (15)$$

$$x_2(k+1)=x_2(k)+\Delta t*x_1(k). \quad (16)$$

where $x_1$ and $x_2$ are state variables and $\Delta t$ is the sampling period (control loop time). Thus, the desired lateral velocity $V_{yd}$ and the desired yaw rate $\Omega_d$ can be computed according to the equations:

$$V_{yd}=b_1*(x_1-z_{vy}*x_2), \text{ and} \quad (17)$$

$$\Omega_d=b_2*(x_1-z_\Omega*x_2). \quad (18)$$

The magnitudes of the desired lateral velocity $V_{yd}$ and the desired yaw rate $\Omega_d$ can then be limited in accordance with the maximum lateral acceleration $a_{ymax}$ that can be sustained on a dry surface. That is, the limited desired yaw rate $\Omega_{d1}$ can be defined as:

$$\Omega_{dl} = \begin{cases} \Omega_d & \text{if } |\Omega_d| \le \Omega_{max} \\ \text{or} \\ \Omega_{max} * \text{sign}(\Omega_d) & \text{if } |\Omega_d| > \Omega_{max} \end{cases} \quad (19)$$

where $\|$ denotes an absolute value, $\Omega_{max}$ is defined as $(a_{ymax}+\Delta a_y)/V_x$, and $\Delta a_y$ is a tunable constant. Similarly, the limited desired lateral velocity $V_{yd1}$ may be defined as:

$$V_{ydl} = \begin{cases} V_{yd} & \text{if } |V_{yd}| \le V_{ymax} \\ \text{or} \\ V_{ymax} * \text{sign}(V_{yd}) & \text{if } |V_{yd}| > V_{ymax} \end{cases} \quad (20)$$

where $V_{ymax}$ is defined as $|b-M*a*V_x^2/[c_r*(a+b)]|*\Omega_{max}$.

The desired slip angle $\beta_d$ can then be computed as $\text{Arctan}(V_{yd}/V_x)$, and the desired lateral acceleration $a_{yd}$ can be computed as $d(V_{yd})/dt+V_x*\Omega_d$.

If desired, the value of $\beta_d$ can additionally be limited as a function of the estimated surface coefficient of adhesion $\mu_e$, the value of which typically ranges from 0.2 (ice) to 1.0 (dry pavement). Specifically, the design engineer may want to choose maximum desired slip angles for the various adhesion conditions; for example, 4° for ice and 10° for dry pavement, the desired slip angle for intermediate coefficients of adhesion being determined by interpolation. Also, the desired slip angle may be limited only if the vehicle speed is above a certain value or when the steering wheel angle δ has a sign opposite to that of the raw desired slip angle.

Alternatively, in mechanizations where the zeros $z_{vy}$ and $z_\Omega$ are specified in a look-up table, the limiting functions can be incorporated into the table as well. In this case, the maximum values $z_{vymax}$ and $z_{\Omega max}$ for the zeros $z_{vy}$ and $z_\Omega$ may be given by the expressions:

$$z_{\Omega max}=\Omega_{max}*\omega_n^2/b_2*\delta, \text{ and} \quad (21)$$

$$z_{vymax}=V_{ymax}*\omega_n^2/b_1*\delta. \quad (22)$$

where a suitable steering angle dead zone can be used to avoid large values of $z_{vymax}$ and $z_{\Omega max}$ for small steering angles.

Figure 4:
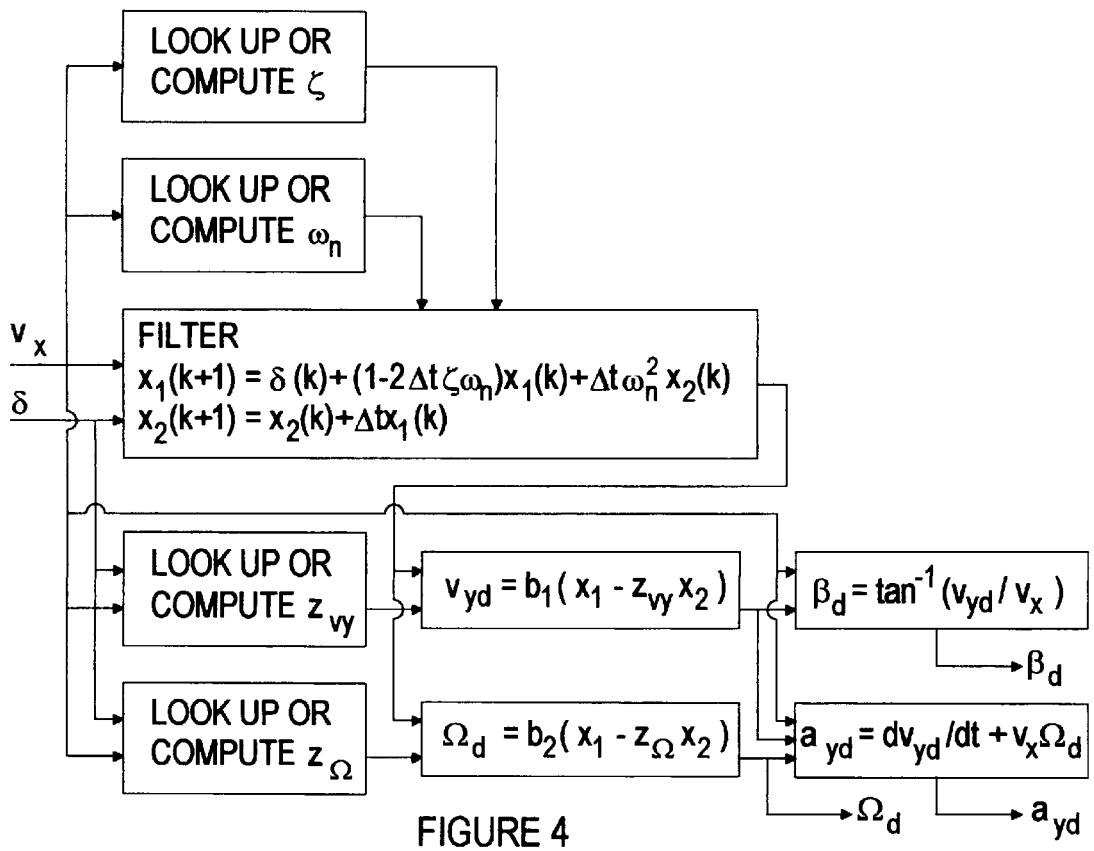
FIG. 4 is a detailed block diagram of the reference model of FIG. 3.

FIG. 4 depicts a block diagram mechanization of the above-described reference model, in which vehicle speed $V_x$ and driver steering angle δ are supplied as inputs, and the model develops the desired yaw rate $\Omega_d$, the desired lateral acceleration $a_{yd}$, and the desired slip angle $\beta_d$. As indicated, the un-damped natural frequency $\omega_n$ and the damping ratio $\zeta$ may be either computed using equations (7) and (8), or may be specified in a look-up table as a function of vehicle speed. Similarly, the zeros $z_{vy}$ and $z_\Omega$ may be computed using equations (9) and (10), or may be specified in a look-up table as a function of vehicle speed and steering angle. The filter function is carried out using equations (15) and (16).

Referring again to FIG. 3, block 120 estimates the surface coefficient of adhesion $\mu_e$ as a function of the desired lateral acceleration $a_{yd}$, the measured lateral acceleration $a_y$, desired yaw rate $\Omega_d$, the measured yaw rate $\Omega_a$, the steering angle δ and the vehicle speed $V_x$. Initially, the measured lateral acceleration $a_{ym}$ is multiplied by a roll factor $r_{fac}$ to compensate for the effect of roll during turning maneuvers. The roll factor $r_{fac}$ may be determined as:

$$r_{fac}=1/(1+M*g*h/\psi_s) \quad (23)$$

where g is the gravity acceleration, h is the height of the vehicle center of gravity 200 and $\psi_s$ is the total roll stiffness of the vehicle suspension. For a typical sedan, the roll factor has a value of approximately 0.9. Additionally, the measured lateral acceleration is subjected to a low pass filter to suppress sensor noise.

The measured and desired lateral acceleration values $a_{ym}$ and $a_{yd}$ are then subjected to a low pass filter to suppress sensor noise, and the desired lateral acceleration $a_{yd}$ is further filtered with a second order low pass filter to form a filtered desired lateral acceleration value $a_{ydf1}$. Finally, $a_{ydf1}$ is limited to $\pm a_{ymax}$, the maximum lateral acceleration sustainable on dry pavement (8 m/s², for example). The filtered lateral acceleration values are then used to compute the lateral acceleration error $\Delta a_y$ according to the expression:

$$|a_y| = |a_{ydf1} - a_{ym}| \tag{26}$$

An estimate of the lateral surface coefficient of adhesion based on lateral acceleration, designated as $\mu_{ay}$, is determined as:

$$\mu_{ay} = |a_{ym}|/a_{ymax} \tag{27}$$

if the measured yaw rate and lateral acceleration values indicate that the vehicle has deviated significantly from the linear reference model and the vehicle is approximately in a steady-state condition. If the measured values indicate that the vehicle is operating in substantial agreement with the linear reference model, the term $\mu_{ay}$ is reset to a default value of 1.0. If none of the above conditions is satisfied, a previous value of the estimated surface coefficient is being held. The estimated lateral surface coefficient $\mu_e$ is computed as:

$$\mu_e = (0.85 + 0.15 * \mu_{ay}) * \mu_{ay} \tag{28}$$

where the parameters 0.85 and 0.15 are calibrated for a given type of vehicle. Finally, the computed value of $\mu_e$ is limited to a minimum value of approximately 0.07, and to a maximum value of 1.0. A filtered version of $\mu_e$ is provided as an input to yaw command block 138 and slip command block 142.

Block 122 estimates the side slip angle of the vehicle with a nonlinear dynamic observer in which measured values of lateral acceleration and yaw rate are used to correct estimates developed by the model, thereby compensating for external disturbances and deviations between the model and the actual system.

Figure 5:
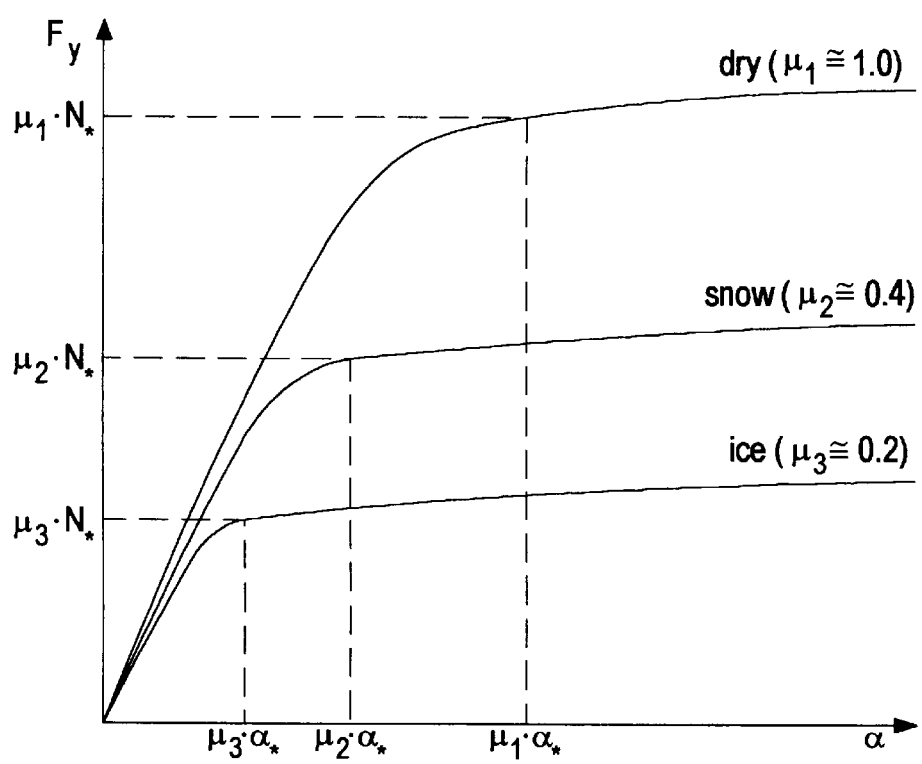
FIG. 5 is a graph of lateral tire force vs. tire slip angle for various levels of lateral adhesion.

Assuming a small steering angle $\delta$, the dynamics of a bicycle model in a horizontal plane can be described by the following equations:

$$dV_y/dt = -V_x * \Omega + (F_{yf} + F_{yr})/M \text{ and} \tag{29}$$

$$d\Omega/dt = (a*F_{yf} - b*F_{yr})/I_{zz} \tag{30}$$

where $V_y$ is the lateral velocity, and $F_{yf}$ and $F_{yr}$ are the lateral forces of the front and rear axles, respectively. The lateral forces $F_{yf}$ and $F_{yr}$ depend on the tire slip angles $\alpha_f$ and $\alpha_r$. They initially rise nearly linearly with slip angle, and then saturate at a value proportional to the coefficient of adhesion when the limit of adhesion is reached. Also, the slip angle at saturation is smaller on low coefficient surfaces than on high coefficient surfaces. To capture these properties, they are preferably modeled at each axle by the combination of a parabolic segment and a straight line, as a function of slip angle and the estimated coefficient of adhesion $\mu_e$, as seen in FIG. 5.

The following equations also hold true for the bicycle model:

$$dV_y/dt = a_y - V_x * \Omega \text{ and} \tag{31}$$

$$a_y = (F_{yf} + F_{yr})/M \tag{32}$$

The above-described bicycle model equations are used to develop the observer:

$$dV_{ye}/dt = -V_x*\Omega + (F_{yf}+F_{yr})/M + g_1(d\Omega_a/dt - (a*F_{yf}-b*F_{yr})/I_{zz})$$
$$-g_2(dV_{ye}/dt - a_{ym} + V_x*\Omega_a) - g_3(a_{ym} - (F_{yf}+F_{yr})/M) \tag{33}$$

where the subscript "e" designates an estimated value, and the subscript "a" or "m" designates an actual or measured value, and the observer gains are designated as $g_1$, $g_2$ and $g_3$. The first two terms comprise an open loop dynamic model of the vehicle responsive to the measured yaw rate and vehicle speed and the estimated tire forces, and the remaining terms comprise a closed-loop component in which $g_1$ is multiplied by the yaw rate error, $g_2$ is multiplied by the lateral velocity error, and $g_3$ is multiplied by the lateral acceleration error.

The above described observer does not take into account the road bank angle, which affects vehicle dynamics and the measured lateral acceleration. To reduce the tendency of the observer to develop steady state error due to a constant bank angle, the lateral acceleration error is subjected to a low pass filter and fed back into the observer. Thus, the observer becomes:

$$dV_{ye}/dt = V_x*\Omega + (F_{yf}+F_{yr})/M + g_1*(d\Omega_a/dt - (a*F_{yf}-b*F_{yr})/I_{zz})$$
$$-g_2(dV_{ye}/dt - a_{ym} + V_x*\Omega_a) - g_3*\Delta A_y - g_4*\Delta A_{yf} \tag{34}$$

where $\Delta A_y$ is $[a_{ym} - (F_{yf}+F_{yr})/M]$ and $\Delta A_{yf}$ is the filtered version of $\Delta A_y$.

Differentiation of the yaw rate is avoided by defining a variable q as follows:

$$q = (1+g_2)*V_{ye} - g_1*\Omega_a \tag{35}$$

so that the observer may be expressed in the form:

$$dq/dt = -(1+g_2)*V_x*\Omega_a + [(1+g_3)/M - a*g_1/I_{zz}]*F_{yfe} + [(1+g_3)/M + b*g_1/I_{zz}]*F_{yre} + (g_2-g_3)*a_{ym} - g_4*\Delta A_{yf} \tag{36}$$

The above equation is easily converted to discrete form, and estimates of the lateral velocity $V_{ye}$ and slip angle $\beta_e$ are obtained from the equations:

$$V_{ye} = (q + g_1*\Omega_a)/(1+g_2), \text{ and} \tag{37}$$

$$\beta_e = Arctan (V_{ye}/V_x). \tag{38}$$

In a practical mechanization of the above-described observer, the front and rear tire side slip angles $\alpha_{fe}$ and $\alpha_{re}$ can be estimated based on the last estimate of lateral velocity, the actual yaw rate, vehicle speed and steering angle, as follows:

$$\alpha_{fe} = [V_{ye}(k-1) + a*\Omega_a]/V_x - \delta, \text{ and} \tag{39}$$

$$\alpha_{re} = [V_{ye}(k-1) - b*\Omega_a]/V_x. \tag{40}$$

The corresponding lateral forces $F_{yfe}$ and $F_{yre}$ can then be computed as follows:

$$F_{yfe} = \begin{cases} -c_f * \alpha_{fe} * (1 - b_{cf} * |\alpha_{fe}|/\mu_e) & \text{if } |\alpha_{fe}| < \mu_e * \alpha_{f^*} \\ \text{or} \\ -N_{f^*} * (|\alpha_{fe}|/\alpha_{fe}) * \\ \quad [\mu_e + s_f * (|\alpha_{fe}|/\alpha_{f^*} - \mu_e)] & \text{if } |\alpha_{fe}| \geq \mu_e * \alpha_{f^*} \end{cases} \tag{41}$$

$$F_{yre} = \begin{cases} -c_r * \alpha_{re} * (1 - b_{cr} * |\alpha_{re}|/\mu_e) & \text{if } |\alpha_{re}| < \mu_e * \alpha_{r^*} \\ \text{or} \\ -N_{r^*} * (|\alpha_{re}|/\alpha_{re}) * \\ \quad [\mu_e + s_r * (|\alpha_{re}|/\alpha_{r^*} - \mu_e)] & \text{if } |\alpha_{re}| \geq \mu_e * \alpha_{r^*} \end{cases} \tag{42}$$

In the expressions for $F_{yfe}$, $s_f$ is defined as the slope of $F_{yf}$ vs. $\alpha_f$ curve (FIG. 5) at the limit of adhesion, $\alpha_{f^*}$ is defined as $1/(2*b_{cf})$, $b_{cf}$ is defined as $c_f/(4*N_{f^*})$, and $N_{f^*}$ is defined as:

$$N_{f^*} = M*b*(a_{ymax} + \Delta_a)/(a+b) \tag{43}$$

where $a_{ymax}$ is the maximum lateral acceleration that the vehicle can sustain on a dry surface, and $\Delta_a$ is a constant, such as 0.5 m/s².

Similarly, in the expressions for $F_{yre}$, $s_r$ is defined as the slope of $F_{yf}$ vs. $\alpha_f$ curve (FIG. 5) at the limit of adhesion, $\alpha_{r^*}$ is defined as $1/(2^*b_{cr})$, $b_{cr}$ is defined as $c_r/(4^*N_{r^*})$, and $N_{r^*}$ is defined as:

$$N_{r^*}=M^*a^*(a_{ymax}+\Delta_a)/(a+b). \tag{44}$$

The system state value $q(k)$ is then computed according to the equation:

$$q(k)=q(k-1)+\Delta t^*\{-(1+g_2)^*V_x^*\Omega_a+((1+g_3)/M-a^*g_1/I_{zz})^*F_{yfe}+[(1+g_3)/M+b^*g_1/I_{zz}]^*F_{yre}+(g_2-g_3)^*a_{ym}g_4^*\Delta A_{yf}\}. \tag{45}$$

Finally, the lateral velocity and slip angle estimates are determined as a function of the state variable $q(k)$ according to the equations:

$$V_{ye}(k)=[q(k)+g_1^*\Omega_a]/(1+g_2), \text{ and} \tag{46}$$

$$\beta_e=Arctan[V_{ye}(k)/V_x]. \tag{47}$$

The gains $g_1$, $g_2$, $g_3$ and $g_4$ are tuning parameters preset by a system designer, typically through routine experimentation on a test vehicle, and may vary from implementation to implementation.

Referring again to FIG. 3, the desired yaw rate $\Omega_d$ and the actual yaw rate $\Omega_a$ are compared at block 134 to form a yaw rate error signal $\Delta\Omega$ on line 136, which is provided as an input to yaw command block 138. Similarly, the desired slip angle $\beta_d$ and the estimated slip angle $\beta_e$ are compared at block 135 to form a slip angle error signal $\Delta\beta$ on line 137, which is provided as an input to slip command block 142. The yaw rate and slip angle commands are then summed at block 146 to form an overall command $\Delta M$ for Output Command block 154.

The yaw rate and slip angle command blocks 138 and 142 determine yaw rate and slip angle commands by applying suitable proportional and derivative gain terms to the respective error signals. The preliminary slip angle proportional gain $k_{\beta p}'$ varies as a function of vehicle speed $V_x$ and the estimated lateral surface coefficient of adhesion $\mu_e$. In general, $k_{\beta p}'$ increases with decreasing values of $\mu_e$, and increases with increasing values of $V_x$ up to a threshold speed, such as 20 m/sec. In practice, the gain may be implemented mathematically, or through the use of a look-up table.

Additional gain factors $f_1$ and $f_2$ specific to the slip and yaw command blocks 142 and 138 control the relative influence or authority of the slip and yaw blocks on the overall command $\Delta M$. The factor $f_1$ is computed as:

$$f_1=(k_{off}+k_{mult}^*|\beta_e|/\beta_{max})^2 \tag{48}$$

where $k_{off}$ and $k_{mult}$ are tuning parameters having example values of 1.0 and 0.5, respectively. The factor $f_1$ increases in value as the estimated slip angle $\beta_e$ approaches or exceeds the maximum allowable limit $\beta_{max}$, and is limited to a maximum value, such as 4.0. The proportional and derivative slip angle gains $k_{\beta p}$ and $k_{\beta d}$ are determined as:

$$k_{\beta p}=c_1^*f_1^*k_{\beta p}', \text{ and} \tag{49}$$

$$k_{\beta d}=c_{\beta d}^*k_{\beta p} \tag{50}$$

where $c_1$ is a tuning constant and $c_{\beta d}$ is the ratio between the differential and proportional gains (0.7, for example).

Similarly, the gain factor $f_2$ for the yaw rate block 138 is computed as:

$$f_2=1.25^*[(c_2-0.2)+\mu_e(1-c_2)] \tag{51}$$

where $c_2$ is a fractional calibration constant, such as 0.4. The factor $f_2$ thus decreases in value as the estimated lateral surface coefficient of adhesion $\mu_e$ increases. The proportional and derivative yaw rate gains $k_{\Omega p}$ and $k_{\Omega d}$ are determined as:

$$k_{\Omega p}=f_2^*k'_{\Omega p}, \text{ and} \tag{52}$$

$$k_{\Omega d}=c_{\Omega d}^*k_{\Omega p} \tag{53}$$

where $c_{\Omega d}$ is the ratio between the differential and proportional gains (0.4, for example), and $k'_{\Omega p}$ is a preliminary gain that may be constant or velocity dependent.

Thus, the gain factor $f_1$ operates to increase the slip angle control gains when the vehicle slip angle increases, and the gain factor $f_2$ increases the yaw rate control gains with increasing coefficient of adhesion. This provides an advantageous tradeoff between yaw rate and slip angle control.

The overall control of blocks 134, 135, 138, 142 and 146 in terms of the corrective yaw moment can be given by the expression $$\Delta M=k_{\beta p}^*(\beta_d-\beta_e)+k_{\beta d}^*(a_{ym}/V_x-\Omega_a)+k_{\Omega p}^*(\Omega_d-\Omega_a)+k_{\Omega d}^*d(\Omega_d-\Omega_a)/dt \tag{54}$$

The slip angle term $(a_{ym}/V_x\Omega_a)$ may be subjected to a high pass "wash-out" filter in order to reduce the effects of sensor bias and banking of the road.

The output command block 154 determines if the vehicle is an oversteer or an understeer condition. An understeer condition is indicated if the overall error signal $\Delta M$ and the steering angle $\delta$ have the same sign. An oversteer condition is indicated if $\Delta M$ and $\delta$ have opposite signs. A deadzone may be employed to stabilize the indication.

The corrective yaw force F is determined as:

$$F=\Delta M/d \tag{55}$$

where d is the track width of the vehicle. The force command F is distributed to the actuators 132 for the various brakes 128 based on the steering angle direction and the driver braking.

In an understeer condition, braking is applied in approximately equal distribution to the inside rear and inside front wheels if there is no driver braking. However, if the estimated lateral force $F_{yre}$ of the rear axle and the steering angle $\delta$ have opposite signs, the distribution is biased toward the inside front wheel. If anti-lock braking control is activated for the rear wheels before the desired braking force is developed, the undeveloped portion of the desired braking force is applied to the inside front wheel. If the driver is braking, and anti-lock braking is activated for both front and rear wheels, the brake command for the outside front wheel is reduced to achieve at least a portion of the desired yaw moment.

In an oversteer condition, braking is applied to the outside front wheel only, and may be allowed to exceed the anti-lock braking limit. If the driver is braking, and anti-lock braking control is activated for the inside wheels before the desired braking force is developed, the brake command for the inside rear wheel (and possibly the inside front wheel) is reduced to achieve the desired yaw force.

It will be recognized that the subject invention is not limited to the above-described distribution strategy, and that other distribution strategies, such as described in the pending U.S. patent application Ser. Nos. 08/654,982 and 08/732,582, both of which are assigned to the assignee of this invention, could be utilized alternatively. Additionally, it will be recognized that the slip and yaw commands may be determined in terms of a desired wheel speed difference to be carried by the output command block 154 instead of being determined in terms of the corrective yaw moment.

In any event, braking commands determined by output block 154 are only applied to the actuators 132 once the entry conditions for active brake control are established, and then, only until the exit conditions are established. The entry conditions require that the vehicle speed be above a minimum threshold, such as 5 mph, and either the magnitude of the yaw rate error $|k_{\Omega p}*(\Omega_d-\Omega_a)+k_{\Omega d}* (\Omega_d-\Omega_a)|$ exceeds a yaw rate error threshold or the magnitude of the total corrective yaw moment $|\Delta M|$ exceeds a threshold. An exit condition is established if vehicle speed drops below the minimum threshold, or if the overall yaw moment $|\Delta M|$ or the yaw rate error $|k_{\Omega p}*(\Omega_d-\Omega_a)+k_{\Omega d}*(\Omega_d-\Omega_a)|$ are below respective thresholds for a predetermined period of time. If an exit condition is established, output control block 154 is disabled, terminating any corrective yaw control. Another example of entry an exit conditions is given in the U.S. patent application Ser. No. 08/732,582, which is assigned to the assignee of this invention.

Figure 6:
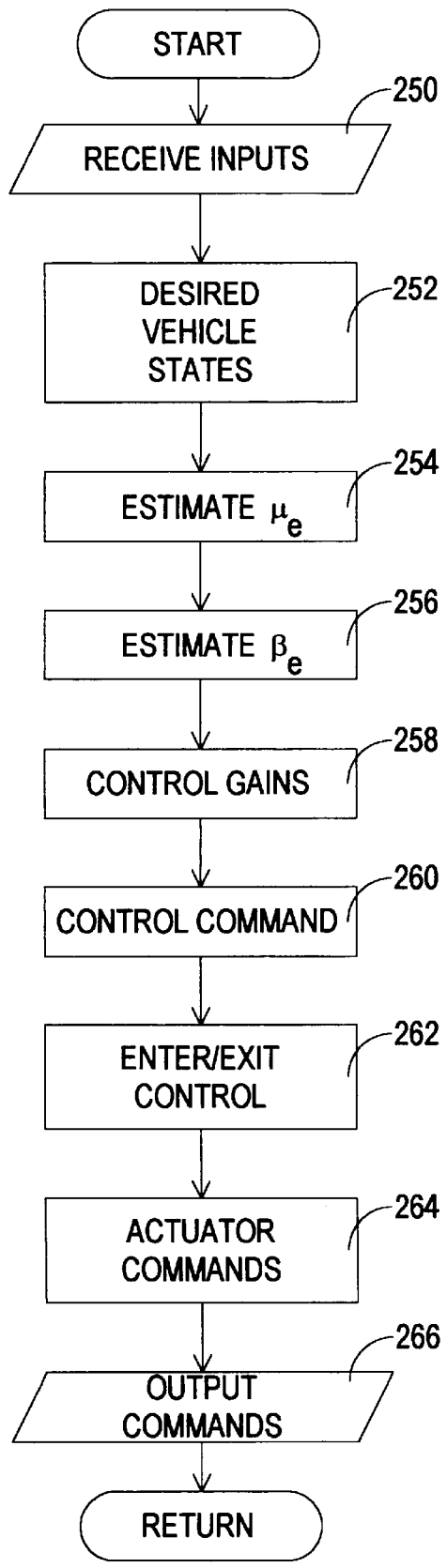
FIG. 6 is a main loop flow diagram representative of computer program instructions executed by the electronic controller of FIG. 1 in carrying out an active brake control in accordance with the block diagram of FIG. 3.

A main flow diagram for the above-described control is set forth in FIG. 6. After reading the various sensor inputs at block 250, the system executes block 252 to determine the desired vehicle states, described above in reference to FIGS. 3–4. The blocks 254 is then executed to estimate the lateral surface coefficient of adhesion $\mu_e$, and block 256 is executed to determine the side slip velocity $V_y$ and the slip angle $\beta_e$. Blocks 258 and 260 are then executed to determine the control gains and the corrective moment command $\Delta M$. The exit and entrance conditions are established at block 262, and the actuator commands are determined and applied to actuators 132 at blocks 264 and 266.

Figure 7:
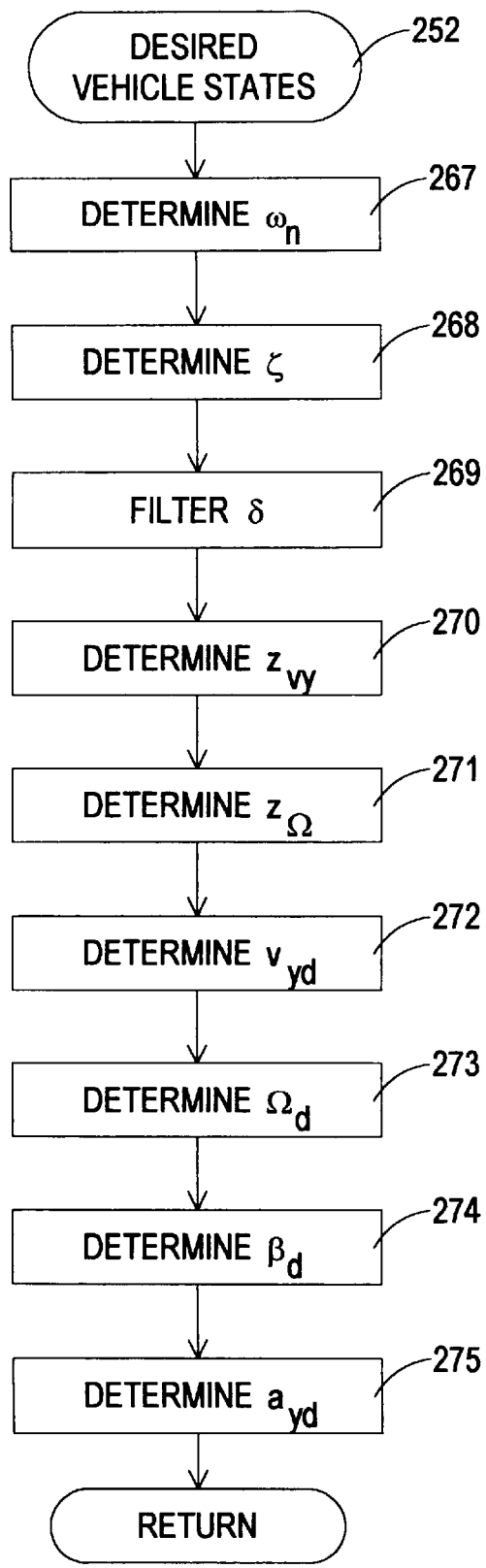
FIG. 7 is a flow diagram detailing a portion of the main flow diagram of FIG. 6 concerning determination of desired yaw rate and desired slip angle according to an example of this invention.

The flow diagram of FIG. 7 details the main flow diagram block 252, in which the desired vehicle states are determined. Blocks 267 and 268 determine the un-damped natural frequency $\omega_n$ and the damping ratio $\zeta$; as indicated above, these may either be computed using equations (7) and (8), or may be specified in look-up tables as a function of vehicle speed. Block 269 then computes the state variables $x_1$ and $x_2$ using equations (15) and (16). Then blocks 270 and 271 determine the zeros $z_{vy}$ and $z_{\Omega}$; as indicated above, these may be computed using equations (9) and (10), or may be specified in a look-up table as a function of vehicle speed and steering angle. Block 272 then determines the desired lateral velocity $V_{yd}$ using equation (17), and block 274 determines the desired yaw rate $\Omega_d$ using equation (18). These values are then limited, preferably in accordance with equations (19) and (20). Block 274 then computes the desired side slip angle $\beta_d$ as $\text{Arctan}(V_{yd}/V_x)$, and block 275 computes the desired lateral acceleration $a_{yd}$ as $d(V_{yd})/dt+V_x*\Omega_d$.

Figure 8:
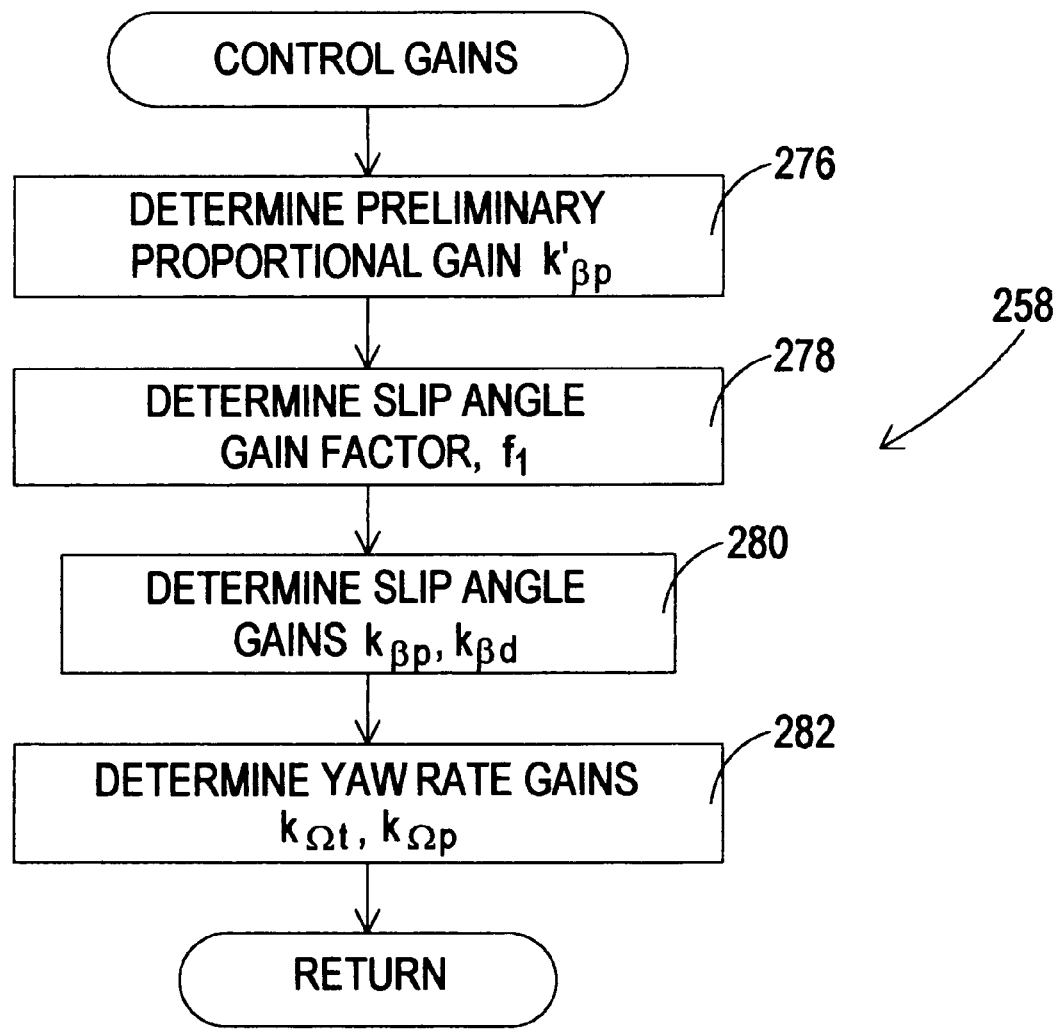
FIG. 8 is a flow diagram detailing a portion of the main flow diagram of FIG. 6 concerning determination of control gains.

The flow diagram of FIG. 8 details the main flow diagram block 258, in which the yaw rate and slip angle control gains are determined. At block 276, the preliminary gain k' and the slip angle limit $\beta_d$ are determined. Then, the gain factor $f_1$ and the slip angle gains $k_{\beta p}$ and $k_{\beta d}$ are determined at blocks 278–280. Finally, the gain factor $f_2$ and the yaw rate gains $k_{\Omega p}$ and $k_{\Omega d}$ are determined at block 282.

Figure 9:
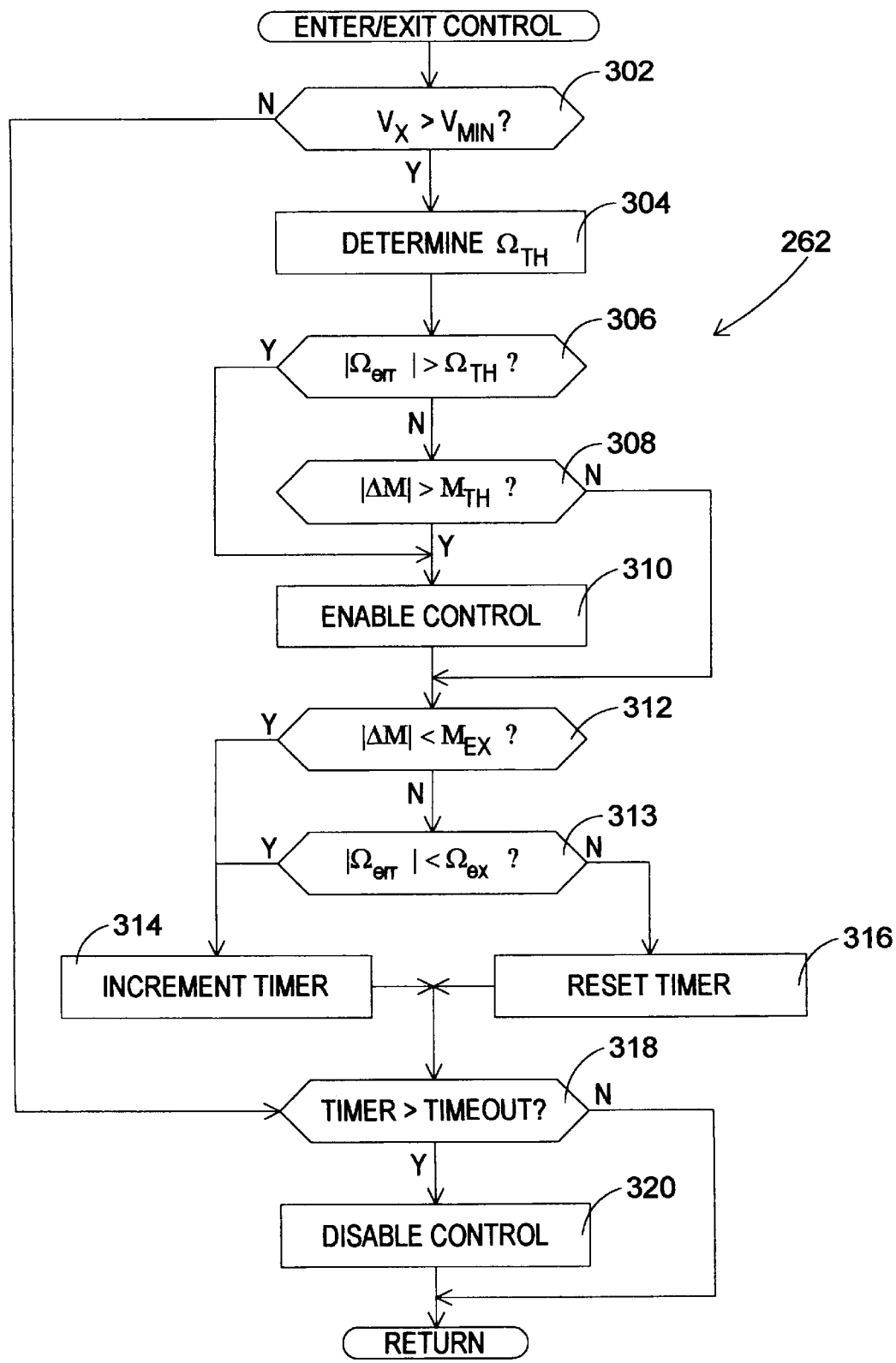
FIG. 9 is a flow diagram detailing a portion of the main flow diagram of FIG. 6 concerning entry/exit conditions.

The flow diagram of FIG. 9 details the main flow diagram block 262, in which the entrance and exit conditions for yaw control are established. If the vehicle velocity $V_x$ is not greater than a minimum velocity threshold $v_{min}$, as determined at block 302, the block 320 is executed to disable active brake control. If $V_x$ is greater than $v_{min}$, blocks 304–306 are executed to determine a threshold yaw rate $\Omega_{th}$, and to compare the magnitude of the yaw error $|\Omega_{error}|$ to the threshold. If the yaw error exceeds the threshold, block 310 is executed to enable active brake control. Even if the yaw error is less than or equal to the threshold, active brake control is enabled if the magnitude of the corrective moment $|\Delta M|$ exceeds a threshold moment $M_{th}$, as determined at block 308. Blocks 312–316 are then executed to identify a condition where either the magnitude of the corrective moment $|\Delta M|$ is below an exit threshold $M_{ex}$ or the magnitude of the yaw error $|\Omega_{error}|$ is below an exit yaw threshold $\Omega_{ex}$, and to time the period for which the identified condition is satisfied. If the timed period exceeds reference time (TIMEOUT), as determined at block 318, the block 320 is executed to disable active brake control.

Figure 10:
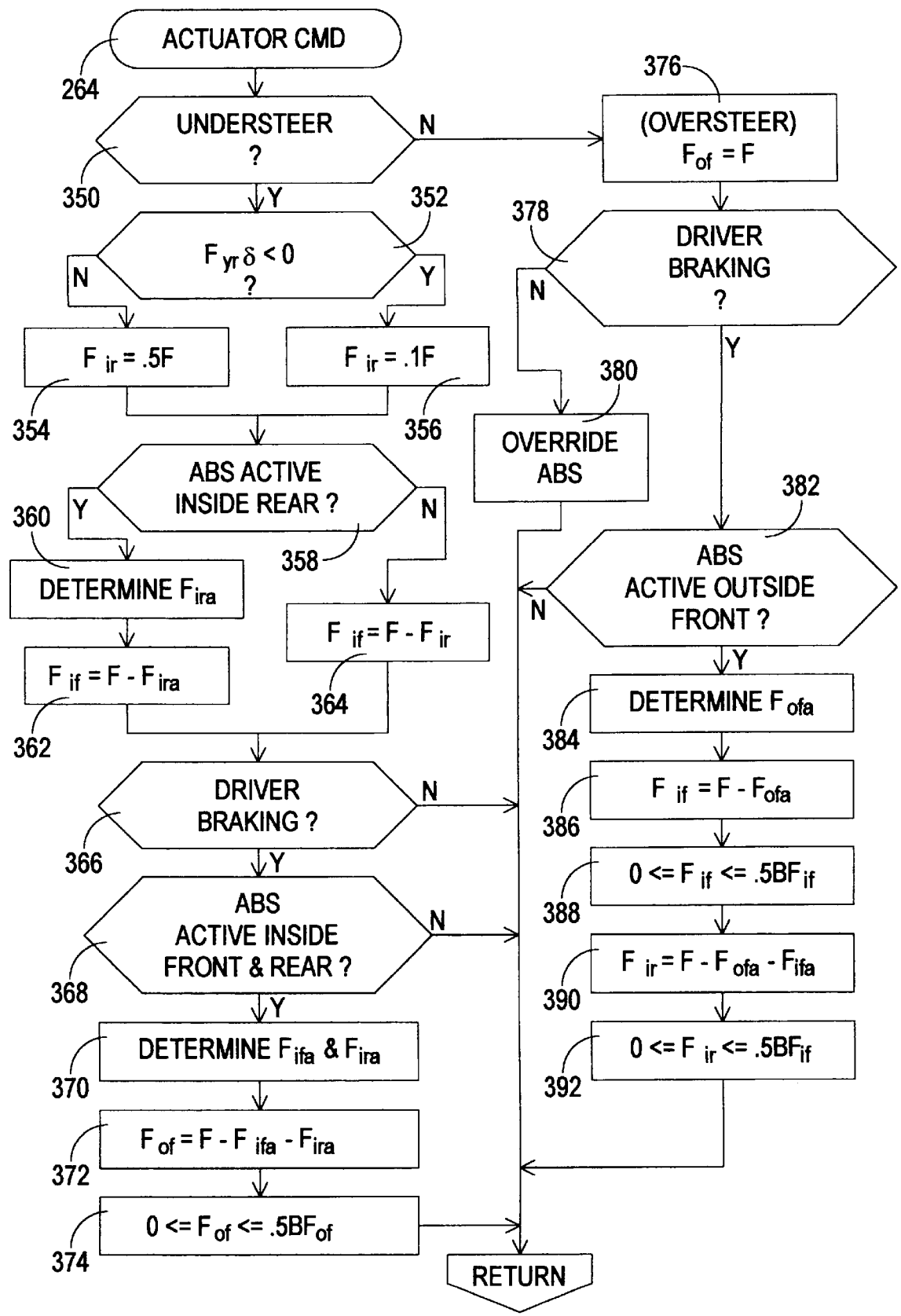
FIG. 10 is a flow diagram detailing a portion of the main flow diagram of FIG. 6 concerning development of actuator commands.

The flow diagram of FIG. 10 details the main flow diagram block 264, in which the actuator commands are developed, assuming a four channel system in which braking forces at the four corners of the vehicle are independently controlled. It is additionally assumed that the control is based on a commanded braking force, as opposed to a commanded wheel speed difference.

If the vehicle is exhibiting understeer, as determined at block 350, the blocks 352–374 are executed to determine the appropriate actuator commands. If the vehicle is exhibiting oversteer, the blocks 376–392 are executed to determine the appropriate actuator commands.

In the understeer condition, the block 352 compares the signs of the estimated lateral force at the rear axle $F_{yr}$ and the steering wheel angle δ by comparing the product $F_{yr}$ δ to zero. If the product is less than zero, the signs are opposite, and block 356 is executed to set the inside rear force command $F_{ir}$ to 10% of the total corrective force F; otherwise, block 354 sets the inside rear force command $F_{ir}$ to 50% of the total corrective force F. If anti-lock brake (ABS) control is activated for the inside rear wheel, as determined at block 358, block 360 determines the braking force $F_{ira}$ at the onset of ABS control, and block 362 sets the inside front force command $F_{if}$ to the difference $(F-F_{ira})$. If ABS is not activated, block 364 sets the inside front force command $F_{if}$ to the difference $(F-F_{ir})$. If there is driver braking, and ABS control is activated for both front and rear inside wheels, as determined at blocks 366–368, block 370–374 are executed to determine a braking force command $F_{of}$ for the outside front wheel. The command $F_{of}$ is determined by determining the actual braking forces $F_{ifa}$ and $F_{ira}$ developed at the inside front and rear wheels, and computing the difference $(F-F_{ifa}-F_{ira})$. This difference cannot be negative, and is limited at block 374 to 50% of the driver commanded brake force $Bf_{of}$ for the outside front wheel.

In the oversteer condition, the brake force command $F_{of}$ for the outside front wheel is set to the total corrective force F at block 376. If there is no driver braking, as determined at block 378, the block 380 is executed to override any ABS activation for the outside front wheel. If there is driver braking, and ABS control is activated for the outside front wheel, as determined at blocks 378 and 382, the blocks 384–386 are executed to determine the actual braking force $F_{ofa}$ at the outside front wheel, and to set the brake force command $F_{if}$ for the inside front wheel equal to the difference $(F-F_{ofa})$. This difference cannot be negative, and is limited at block 388 to 50% of the driver commanded brake force $BF_{if}$ for the inside front wheel. Block 390 then sets the brake force command $F_{ir}$ for the inside rear wheel equal to the difference $(F-F_{ofa}-F_{ifa})$. Again, the difference cannot be negative, and is limited at block 392 to 50% of the driver commanded brake force $BF_{ir}$ for the inside rear wheel.

It will be understood that in the oversteer condition with driver braking, the brake force commands $F_{if}$ and $F_{ir}$ for the front and rear inside wheels represent a commanded reduction in braking force at such wheels. Similarly, in the understeer condition with driver braking, the brake force command $F_{of}$ for the front outside wheel represents a commanded reduction in braking force at such wheel.

While this invention has been described in reference to the illustrated embodiment, it is anticipated that various modifications will occur to those skilled in the art, and that brake controls incorporating such modifications may fall within the scope of the present invention. Accordingly, the scope of the present invention is not limited by the illustrated embodiment, but rather, by the appended claims.

I claim:

1. A brake control method for a vehicle comprising the steps of:
   measuring a longitudinal speed and steering angle of the vehicle;
   determining an un-damped natural frequency, a damping ratio and zeros for first and second transfer functions respectively describing ratios of vehicle yaw rate and lateral velocity to vehicle steering angle as a function of vehicle speed for linear operation of the vehicle;
   computing a desired yaw rate as a function of the measured longitudinal speed and steering angle, and the determined un-damped natural frequency, damping ratio, and the zero of the first transfer function;
   computing a desired lateral velocity as a function of the measured longitudinal speed and steering angle, and the determined undamped natural frequency, damping ratio, and the zero of the second transfer function;
   computing a desired lateral acceleration based on said desired lateral velocity and yaw rate and said measured vehicle speed;
   measuring a lateral acceleration and yaw rate of said vehicle, and forming a yaw rate command for said vehicle based at least in part on a first deviation between said desired and measured yaw rates, and a second deviation between said desired and measured lateral accelerations; and
   differentially braking wheels of said vehicle to impart a yaw moment corresponding to said yaw rate command.

2. The brake control method of claim 1, wherein the step of determining the un-damped natural frequency comprises calculating the un-damped natural frequency from said transfer functions as a function of the measured vehicle speed and vehicle related coefficients of said transfer function.

3. The brake control method of claim 1, wherein the step of determining the damping ratio comprises calculating the damping ratio from said transfer functions as a function of the measured vehicle speed and vehicle related coefficients of said transfer function.

4. The brake control method of claim 1, wherein the step of determining the un-damped natural frequency comprises storing specified values of the un-damped natural frequency in a look-up table as a function of vehicle speed, and retrieving the stored values from said look-up table during operation of said vehicle as a function of the measured vehicle speed.

5. The brake control method of claim 1, wherein the step of determining the damping ratio comprises storing specified values of the damping ratio in a look-up table as a function of vehicle speed, and retrieving the stored values from said look-up table during operation of said vehicle as a function of the measured vehicle speed.

6. The brake control method of claim 1, wherein the step of determining the zeros of said first and second transfer functions comprises calculating the zeros from said transfer functions as a function of the measured vehicle speed and vehicle related coefficients of said transfer function.

7. The brake control method of claim 1, wherein the step of determining the zeros of said transfer functions comprises storing specified values of the zeros in a look-up table as a function of vehicle speed, and retrieving the stored values from said look-up table during operation of said vehicle as a function of the measured vehicle speed.

8. A brake control method for a vehicle comprising the steps of:
   measuring a longitudinal speed and steering angle of the vehicle;
   determining an un-damped natural frequency, a damping ratio and zeros for first and second transfer functions respectively describing ratios of vehicle yaw rate and lateral velocity to vehicle steering angle as a function of vehicle speed for linear operation of the vehicle;
   computing a desired yaw rate as a function of the measured longitudinal speed and steering angle, and the determined un-damped natural frequency, damping ratio, and the zero of the first transfer function;
   computing a desired lateral velocity and the vehicle side slip angle as a function of the measured longitudinal speed and steering angle, and the determined un-damped natural frequency, damping ratio, and the zero of the second transfer function;
   computing a desired lateral acceleration based on said desired lateral velocity and yaw rate and said measured vehicle speed;
   measuring a lateral acceleration and yaw rate of said vehicle, and forming a yaw rate command for said vehicle based at least in part on a first deviation between said desired and measured yaw rates, and a second deviation between said desired and measured lateral accelerations;
   estimating the actual vehicle side slip angle, and forming a slip angle command for said vehicle based on the deviation between the desired and estimated slip angle; and
   differentially braking wheels of said vehicle to impart a yaw moment corresponding to a weighted sum of said yaw rate and slip angle commands.

* * * * *